United States Patent
Sheridan et al.

(10) Patent No.: US 9,520,688 B2
(45) Date of Patent: Dec. 13, 2016

(54) JOINT ASSEMBLY FOR A BUSDUCT

(71) Applicant: Electrical Intellectual Property Limited, Burnfoot (IE)

(72) Inventors: Adrian Sheridan, Ras Al Khaimah (AE); Damian McCauley, Eglington (IE)

(73) Assignee: Electrical Intellectual Property Limited, Burnfoot (IE)

( * ) Notice: Subject to any disclaimer, the term of this patent is extended or adjusted under 35 U.S.C. 154(b) by 0 days.

(21) Appl. No.: 14/872,719

(22) Filed: Oct. 1, 2015

(65) Prior Publication Data

US 2016/0104986 A1    Apr. 14, 2016

(30) Foreign Application Priority Data

Oct. 13, 2014 (GB) .................................. 1418037.6

(51) Int. Cl.
| | | |
|---|---|---|
| *H01R 4/60* | (2006.01) | |
| *H01R 25/16* | (2006.01) | |
| *H02G 5/00* | (2006.01) | |
| *H02G 5/10* | (2006.01) | |

(52) U.S. Cl.
CPC ............ *H01R 25/162* (2013.01); *H02G 5/007* (2013.01); *H02G 5/10* (2013.01)

(58) Field of Classification Search
CPC .......... H01R 25/162; H01R 25/16; H02G 5/10
USPC ......................................... 439/213, 485, 487
See application file for complete search history.

(56) References Cited

U.S. PATENT DOCUMENTS

| | | |
|---|---|---|
| 3,104,276 A | 9/1963 | Cataldo et al. |
| 3,183,298 A | 5/1965 | Weimer et al. |
| 3,365,537 A | 1/1968 | Fehr, Jr. et al. |
| 3,383,458 A | 5/1968 | Raskhodoff et al. |
| | (Continued) | |

FOREIGN PATENT DOCUMENTS

| | | |
|---|---|---|
| EP | 0562434 A2 | 9/1993 |
| EP | 0562434 A3 | 3/1995 |

OTHER PUBLICATIONS

International Search Report and Written Opinion for PCT/EP2015/073715, mailed Nov. 27, 2015, 15 pages.

(Continued)

*Primary Examiner* — Javaid Nasri
(74) *Attorney, Agent, or Firm* — Withrow & Terranova, P.L.L.C.

(57) ABSTRACT

A busduct joint assembly comprising a stack of electrically insulating separator plates, a respective busbar receiving gap between defined between each pair of separator plates for receiving respective busbar ends of adjacent busduct sections therein to be in electrical contact with at least one connector plate located therein, upper and lower cover plates being located on either side of the stack of separator plates, a fastener extending between the cover plates and through mutually aligned apertures formed therein in order to clamp the separator plates and connector plates between the cover plates, a side cover being provided on at least one side of the separator plates and having at least one heat exchange rib extending into the stack of separator plates, wherein the at least one heat exchange rib extends between adjacent pairs of separator plates, on an opposite side of the separator plates from the associated busbar receiving gap.

16 Claims, 7 Drawing Sheets

(56) References Cited

U.S. PATENT DOCUMENTS

| | | |
|---|---|---|
| 3,786,394 A | 1/1974 | Koenig et al. |
| 4,009,920 A | 3/1977 | Hicks, Jr. et al. |
| 4,213,003 A | 7/1980 | Carlson |
| 4,272,646 A | 6/1981 | Carlson |
| 4,705,334 A | 11/1987 | Slicer et al. |
| 4,842,533 A | 6/1989 | Beberman et al. |
| 4,849,581 A | 7/1989 | Larkin et al. |
| 4,950,841 A | 8/1990 | Walker et al. |
| 5,068,763 A | 11/1991 | Brown et al. |
| 7,819,681 B1 * | 10/2010 | Rodrigues .............. H02G 5/007 174/88 B |
| 8,177,569 B1 | 5/2012 | Dozier et al. |
| 2014/0141636 A1 | 5/2014 | O'Leary et al. |

OTHER PUBLICATIONS

Extended European Search Report for European Patent Application No. 15188434.3, mailed Nov. 27, 2015, 10 pages.

* cited by examiner

JOINT ASSEMBLY FOR A BUSDUCT

RELATED APPLICATIONS

This application claims priority to United Kingdom national application 1418037.6, filed Oct. 13, 2014, the disclosure of which is hereby incorporated herein by reference in its entirety.

FIELD OF THE INVENTION

This invention relates to a joint assembly for a busduct and in particular to a joint assembly for coupling adjacent busduct sections together wherein the joint assembly incorporates a heat sink assembly.

BACKGROUND

Electrical power distribution busducts typically include an elongate duct containing a plurality of elongate flat electrically conductive busbars, for example three phase busbars, at least one neutral busbar and an earth busbar, separated by electrically insulating material. A busduct system usually includes a plurality of busduct sections coupled together to provide an appropriate length of busduct to connect one piece of electrical apparatus to another in lieu of cables.

One of the major considerations in designing a busduct system is the provision of a busduct joints for joining busduct sections together. The design of these joints presents a number of parameters to consider, including space and size limitations; accommodation of varying numbers of busbars within a single joint design; contact resistances within the joints; insulation break-down between busbars within the joints and arcing between the busbars; attachment of the joints to the busducts and maintenance of the organization of joint components during assembly and installation; and, in particular, the effective dissipation of heat from the conductors within the busduct joint. In addition to designing a joint which takes into account the above-listed design parameters, these parameters must be dealt with in a cost effective manner.

The effective dissipation of heat from a busduct section and from a busduct joint in particular is essential to achieving the testing parameters of the UL and IEC standards which outline the maximum temperature rise limit of electrically conductive material within the busduct joint.

Examples of known busduct joints are found in U.S. Pat. No. 5,068,763; U.S. Pat. No. 4,950,841; U.S. Pat. No. 4,849,581; U.S. Pat. No. 4,842,533; U.S. Pat. No. 4,705,334; U.S. Pat. No. 4,009,920; U.S. Pat. No. 3,786,394; U.S. Pat. No. 3,383,458; U.S. Pat. No. 3,365,537; U.S. Pat. Nos. 3,183,298; and 3,104,276, which are incorporated herein by reference in their entireties. A typical busduct joint including a fastening bolt surrounded by an insulated sleeve, where the fastening bolt extends through and holds together a stack of adjacent pairs of conductive splice plates and insulator plates. Busbars of adjacent busduct sections are inserted between the opposite ends of adjacent pairs of splice plates when the bolt is loosened. The bolt is then tightened to compress the assembly together and provide a tight engagement between the splice plates and corresponding busbars. Then top and bottom covers are installed once the bolt is torqued. Due to manufacturing tolerances the bolt must be quite loose during installation so that sufficient spacing is provided between pairs of splice plates to permit insertion of busbars. A problem with such existing busduct joints is the difficulty in dissipating heat from the tightly stacked splice plates and busbars within the busduct joint.

SUMMARY

According to a first aspect of the present invention there is provided a joint assembly for a busduct comprising a stack of electrically insulating separator plates arranged in mutually adjacent pairs, each pair of separator plates having at least one electrically conductive connector plate located therebetween, each pair of separator plates defining a respective busbar receiving gap therebetween for receiving respective busbar ends of adjacent busduct sections to be in contact with the at least one connector plate therebetween such that said connector plate provides electrical continuity between respective busbars, upper and lower cover plates being located on either side of the stack of separator plates, the separator plates and connector plates having mutually aligned apertures formed therein, a fastener extending between said cover plates and through said mutually aligned apertures in order to clamp the separator plates and connector plates between the cover plates, a side cover being provided on at least one side of the stack of separator plates extending perpendicular to the separator plates, said side cover having at least one heat exchange rib extending from an inner face of the side cover to extend into the stack of separator plates, wherein said at least one heat exchange rib extends between adjacent pairs of separator plates, on an opposite side of the separator plates from the associated busbar receiving gap.

In a preferred embodiment a pair of side covers may be provided, located on opposite sides of the stack of separator plates, each side cover having at least one heat exchange rib extending from an inner face of the side cover to extend into the stack of separator plates, wherein said at least one heat exchange rib extends between adjacent separator plates, on an opposite side of said separator plates from the associated busbar receiving gap.

Preferably the or each side cover is provided with a plurality of substantially parallel heat exchange ribs arranged to extend between respective pairs of separator plates on a side of the separator plates opposite said connector plates.

The or each side cover may be provided with cooling fins on an outer surface thereof for increasing the surface area of the side cover to enhance heat transfer therefrom.

The or each side cover may be formed from an electrically conductive material. In a preferred embodiment the or each side cover is formed from aluminium, although it is envisaged that the side covers may be formed from other materials, preferably materials having good thermal conductivity.

The or each side cover may include lateral side flanges extending inwardly from upper and lower edges of the or each side cover to increase the surface area of the side covers, further enhancing heat transfer from the joint assembly.

A pair of connector plates may be located between each pair of separator plates such that an end of a busbar can be received between each pair of connector plates.

The connector plates may be formed from copper or aluminium or an other suitable electrically conductive material.

In one embodiment, spacers may be located between each pair of separator plates to maintain a gap between each pair of spacer plates to enable the busbars of adjacent busduct sections to be inserted therebetween. Preferably the spacers are formed from an electrically insulating material. Each spacer may be provided with a central aperture through which said fastener extends. Each separator plate may include a recessed channel formed therein dimensioned to receive a respective spacer therein to locate the spacers in position between respective opposing pairs of separator plates, wherein the spacers engage the recessed channels of the each respective pair of separator plates. Preferably said recessed channel is formed in a raised wall located around the fastener on a side of each separator plate adjacent to the associated at least one connector plate.

The or each side cover may be formed by an extrusion process.

According to a further aspect of the present invention there is provided a busduct assembly comprising first and second busduct sections, each busduct section comprising a plurality of busbars located within a busduct housing wherein said busbars extending beyond said housing at either end thereof, and a joint assembly in accordance with the first embodiment of the invention, wherein respective busbars of the first busduct are electrically coupled to corresponding busbars of the second busduct via the joint assembly.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

A busduct joint assembly in accordance with an embodiment of the present invention will now be described, by way of example only, with reference to the accompanying drawings, in which.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
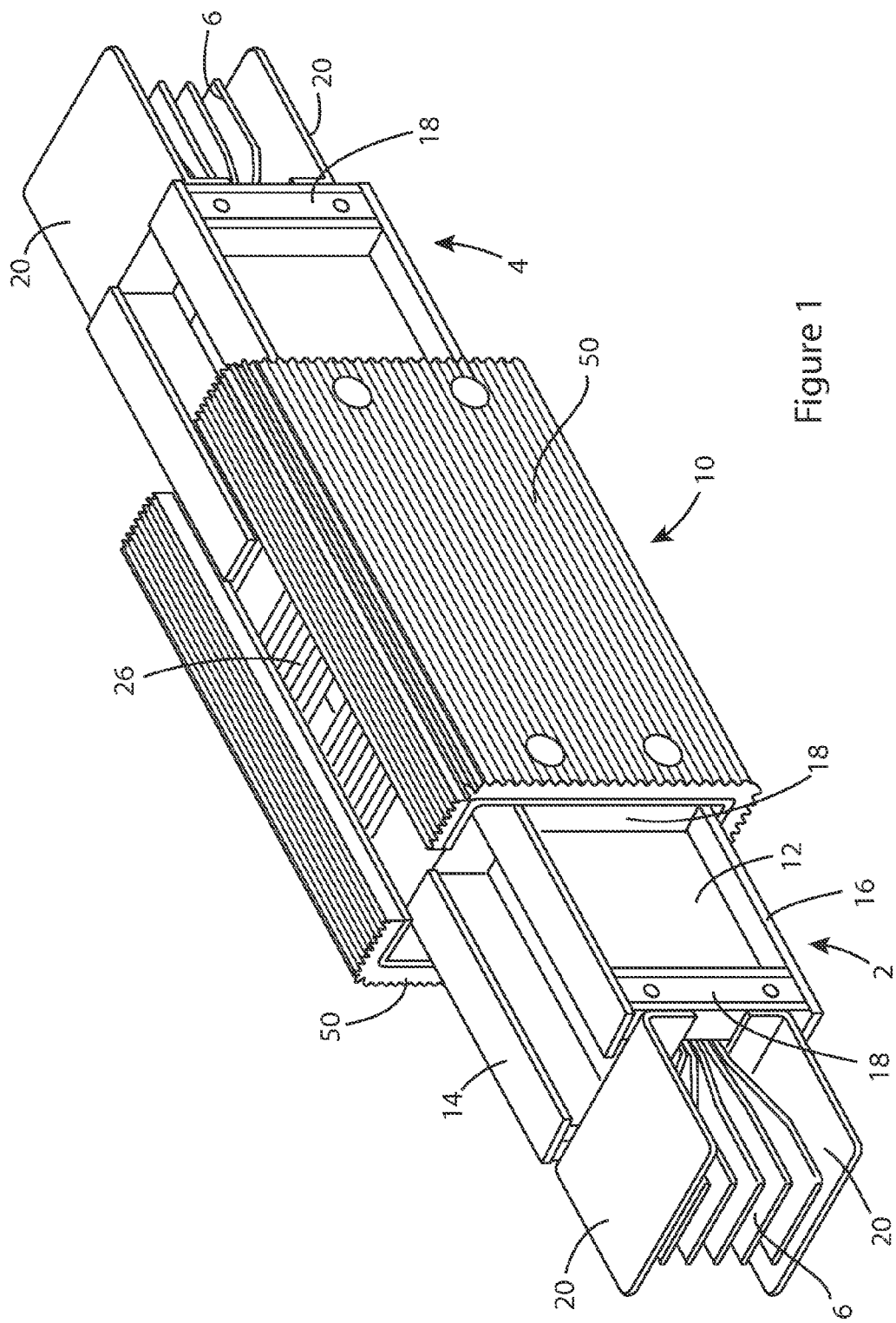
FIG. 1 is a perspective view of a busduct joint assembly in accordance with an embodiment of the present invention interconnecting two busduct sections.
Figure 2:
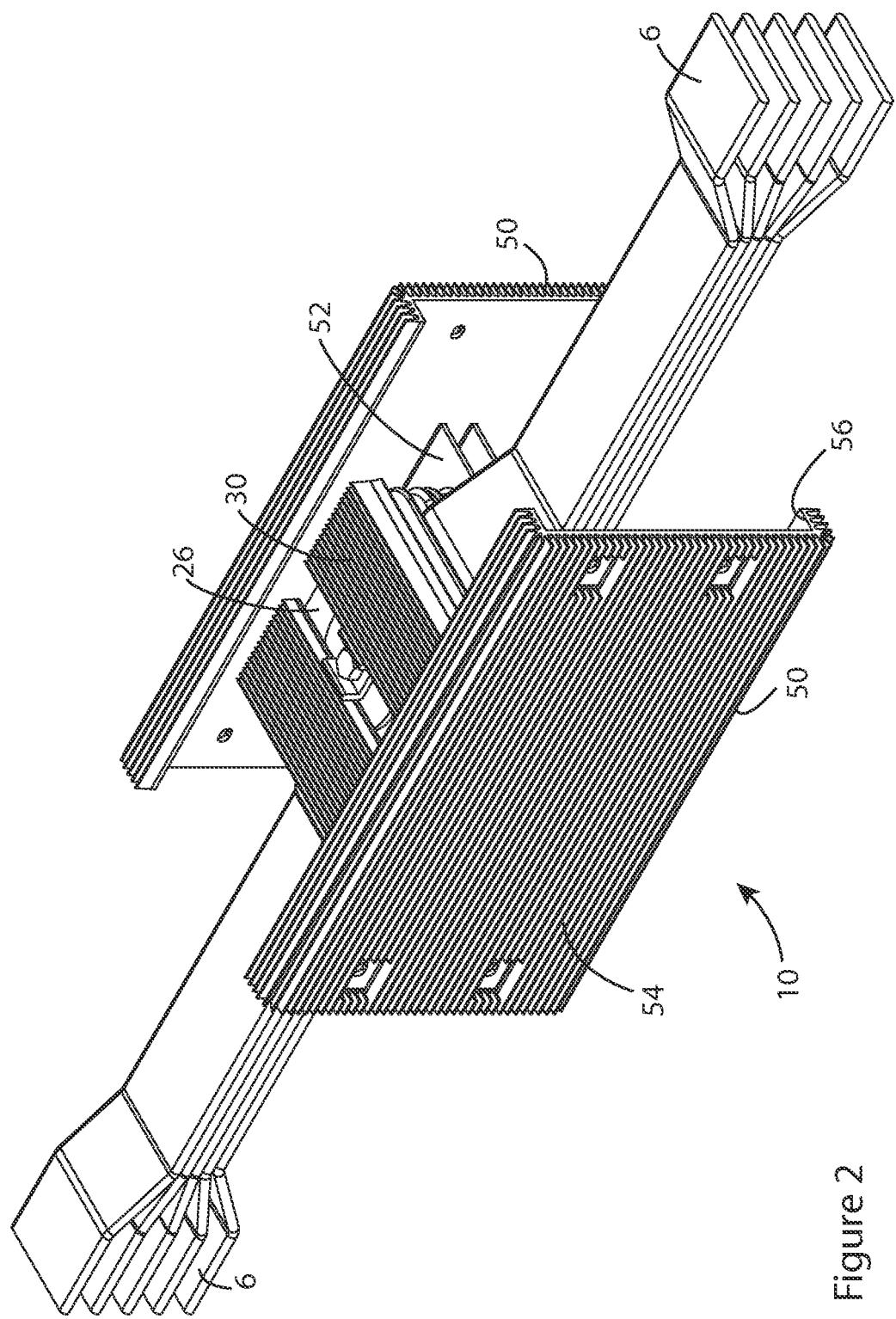
FIG. 2 is a perspective view of the busduct joint assembly of FIG. 1 with the housing of the busduct sections removed for clarity.
Figure 3:
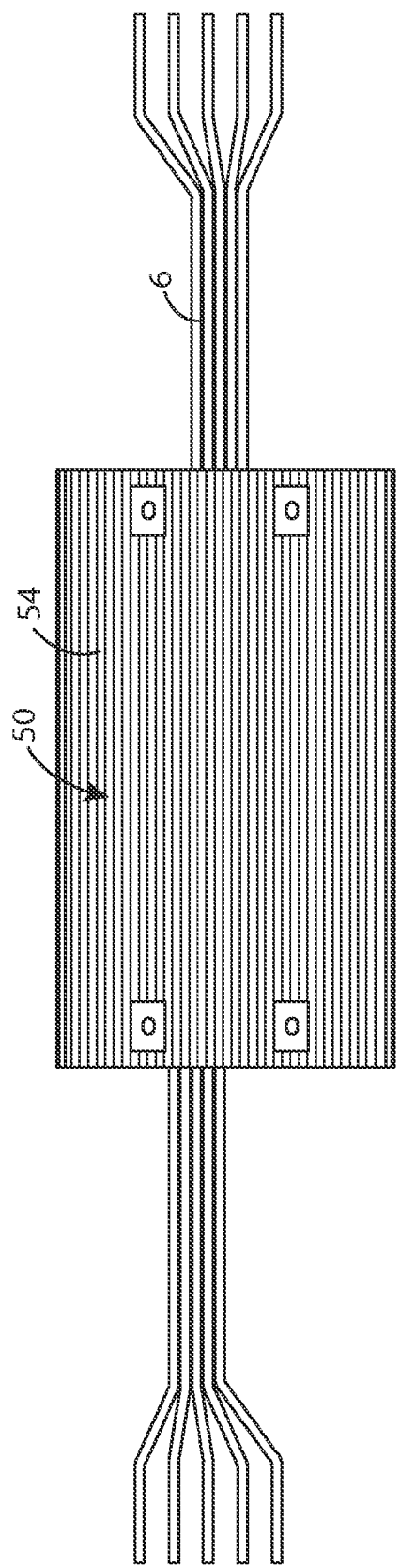
FIG. 3 is a side view of the assembly of FIG. 2.
Figure 4:
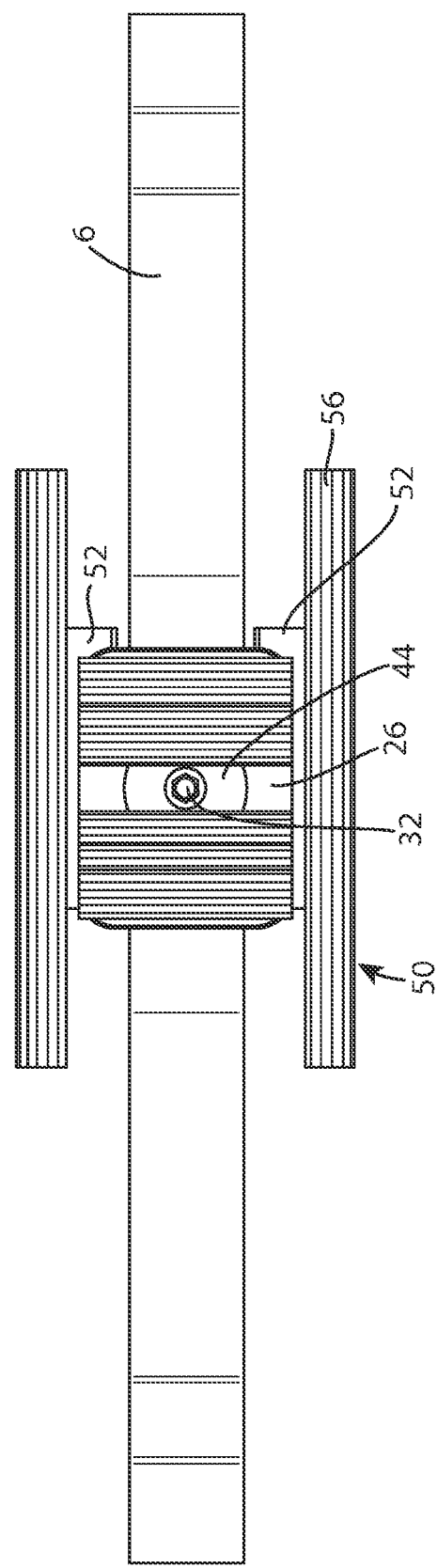
FIG. 4 is a plan view of the assembly of FIG. 2.
Figure 5:
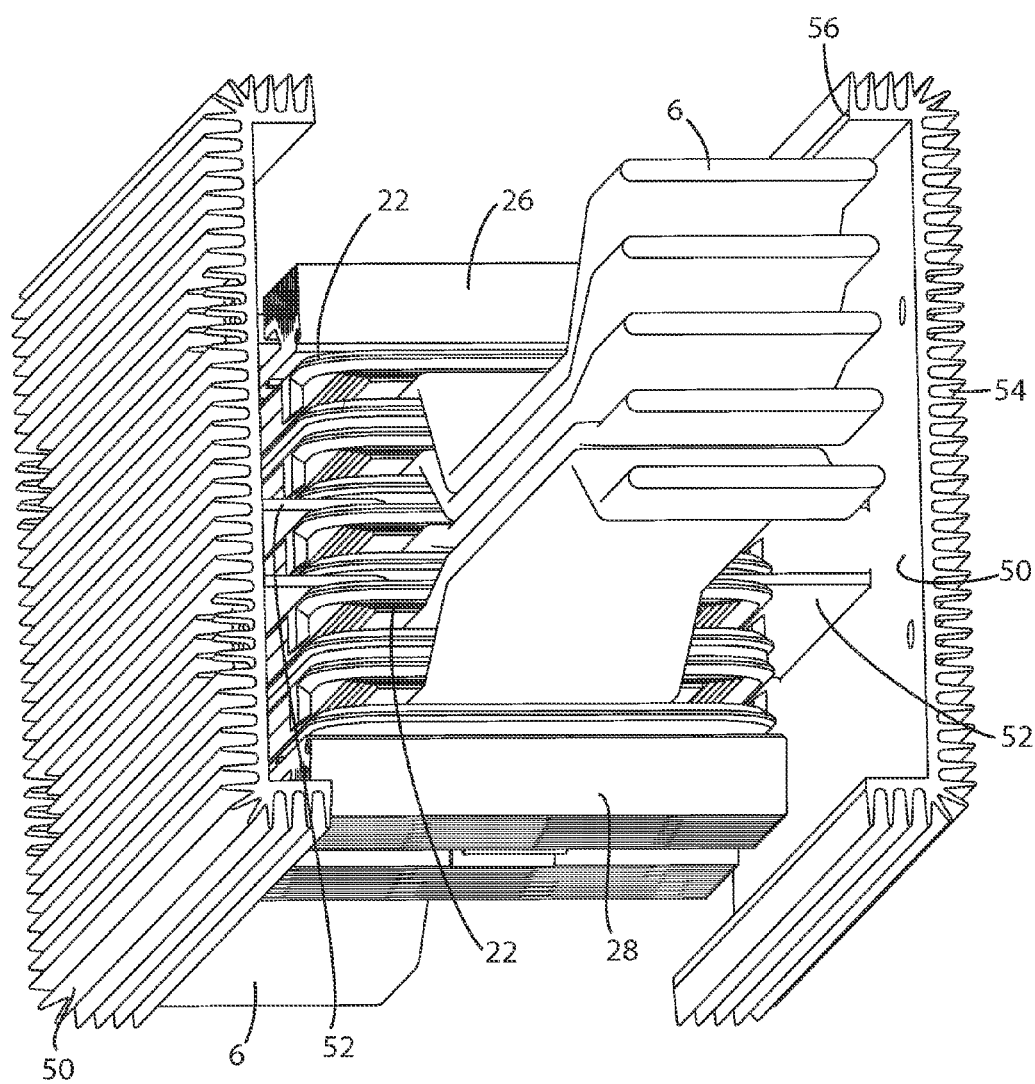
FIG. 5 is an end perspective view of the assembly of FIG. 2.
Figure 6:
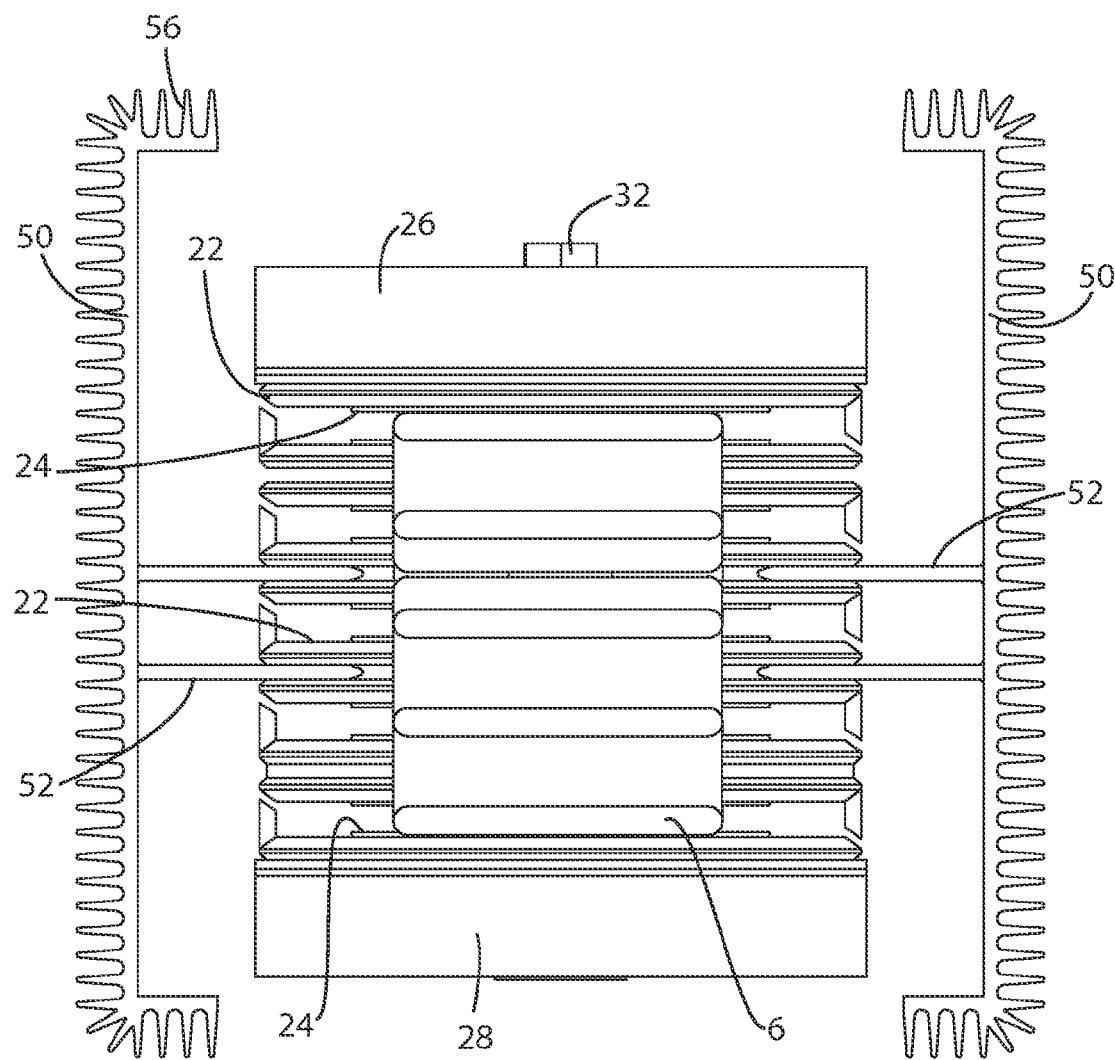
FIG. 6 is an end view of the assembly of FIG. 2.
Figure 7:
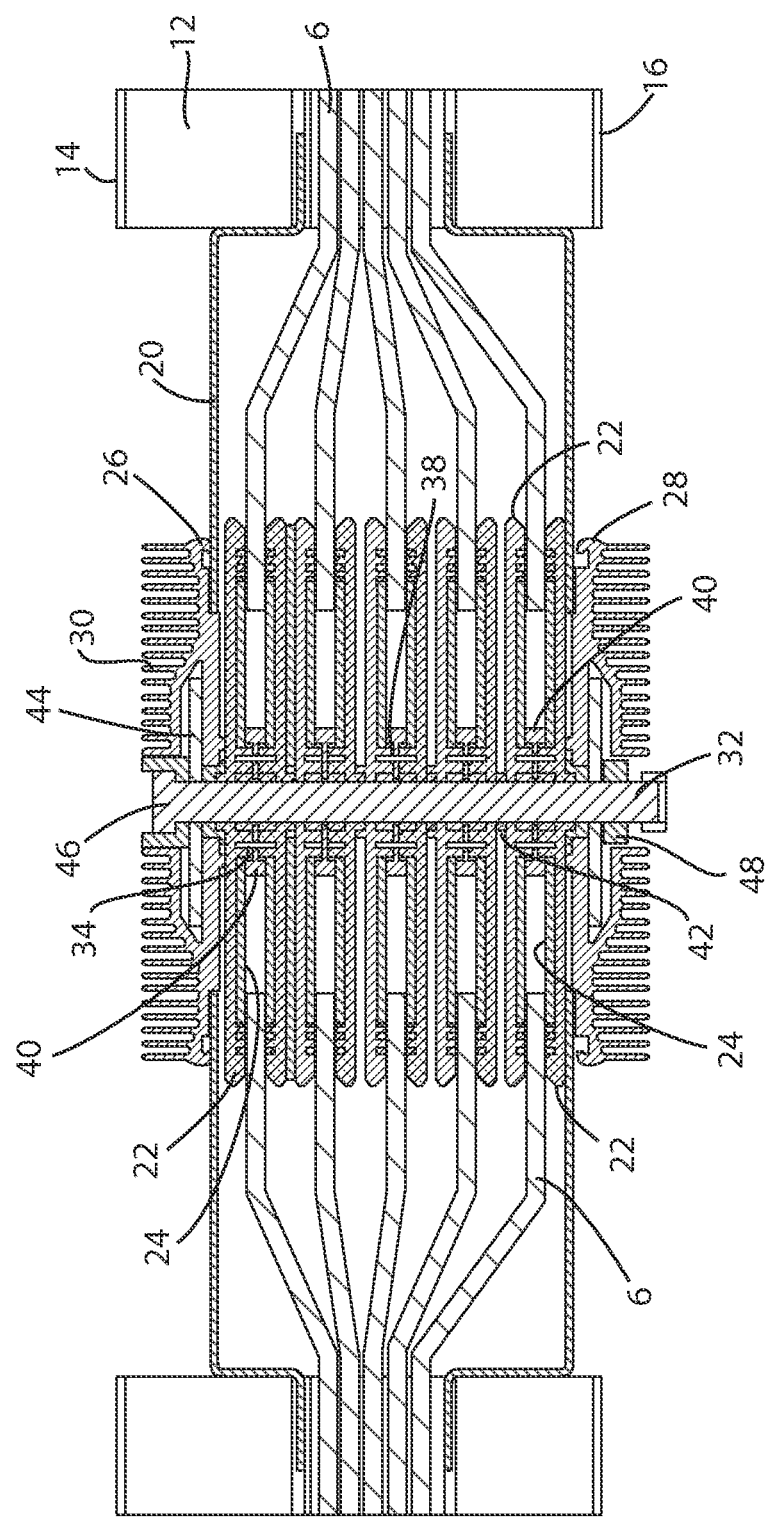
FIG. 7 is a longitudinal sectional view through the assembly of FIG. 1.

With reference to FIG. 1, a busduct joint assembly 10 in accordance with the present invention is shown joining first and second busduct sections 2,4 in end to end relationship. Each busduct section 2,4 includes a plurality of electrically conductive busbars 6 enclosed in a rigid duct or housing. The duct of each busduct section has been omitted from FIGS. 2 to 5 to better show the detail of the busduct joint assembly. The busduct housing may be formed from extruded aluminium sections. Alternatively the housing may be formed from steel or a rigid thermally conductive plastic material, preferably formed by extrusion.

As shown in FIG. 1, the outer side plates 12 of each busduct housing include upper and lower flanges 14,16 disposed at the upper and lower edges of the side plates 12, extending substantially parallel to the busbars 6. These flanges 14,16 provide strength, a structure from which the busduct may be supported and also provide additional surface area for dispersing heat from the busducts.

Fixing blocks 18 may be provided on an outer face of the duct housing side plates 14,16 at each end of each busduct section 2,4 to facilitate connection of the busduct sections 2,4 to the joint assembly 10, as will be described in more detail below, and to seal the busduct joint assembly 10, as well as to act an earth path between the busduct joint assembly 10 and the busduct sections 2,4 and to enable heat transfer between therebetween and finally to add structural strength to the ends of the busduct sections 2,4. Earth plates 20 extend from each end of the busduct sections 2,4 above and below the busbars 6 to provide an earth return path during short circuit events by electrically connecting two busduct sections together through the busduct joint assembly 10.

Various combinations of busbars 6 may be provided in each busduct section 2,4. For example each busduct section 2,4 may include three phase busbars, a ground busbar, and one or more neutral busbars. Each busbar 6 may comprise an elongate strip of electrically conductive material, such as copper or aluminium, having a substantially rectangular cross-section which may have rounded corners. For typical applications, the busbars may be configured to carry between 225 and 6600 amperes of current at potentials ranging from 100 to 1000 volts.

The busduct sections 2,4 and the busduct joint assembly 10 must conduct sufficient heat from the conductive components of the assembly to the external surfaces of the assembly, and hence into the atmosphere, at such currents and potentials to avoid the creation of hot spots exceeding the maximum operating temperatures of the insulation material and/or exceeding the limits of temperature rise set out of IEC 61439 and UL857.

The busduct joint assembly 10 comprises a sandwich construction comprising pairs of electrically insulating separator plates 22 having located therebetween pairs of electrically conductive connector plates 24 for electrically coupling the respective busbars 6 of the first and second busduct sections 2,4 to one another when the respective busbars 6 are located therebetween, on either side of the joint assembly 10. A pair of opposing connector plates 24 and cooperating separator plates 22 are provided for each busbar of the busduct sections 2,4. Each of the pairs of opposing connector plates 24 defines a respective space therebetween, open at opposite ends of the busduct joint assembly 10, for receiving respective busbars 6 of the first and second busduct sections 2,4 to electrically couple said busbars 6.

Upper and lower cover plates 26,28 are provided to be located on either side of the stack of separator plates 22 and connector plates 24, the cover plates 26,28 having integrally formed fins provided an outer face thereof such that the cover plates 26,28 act as heat sinks. The cover plates 26,28 are preferably formed from an electrically conductive material having good thermal conductivity, such as aluminium, and may be formed by an extrusion or moulding process.

The separator plates 22, connector plates 24 and upper and lower cover plates 26,28 each include a central opening for accepting a bolt 32 therethrough, whereby the bolt 32 can pass through the assembly of plates, such that, when tightened, the bolt 32 clamps the assembly of plates together, compressing each opposing pair of connector plates 24 against the respective busbars 6 of the busduct sections 2,4.

The separator plates 22 are fabricated from a thermally conductive and electrically insulating material, such as BMC (Bulk Moulding Compound) or Polyester, having good electrical insulation properties and high thermal conductivity. The connector plates 24 are fabricated from an electrically conductive material, such as copper or aluminium.

Moulded spacers 34, preferably formed from an electrically insulating material, such as plastic, may be located between each pair of separator plates 22 around the bolt openings to maintain spacing between the spacer plates 22 to enable the busbars of adjacent busduct sections to be inserted between the respective connector plate 24 located therebetween.

Figure 8:
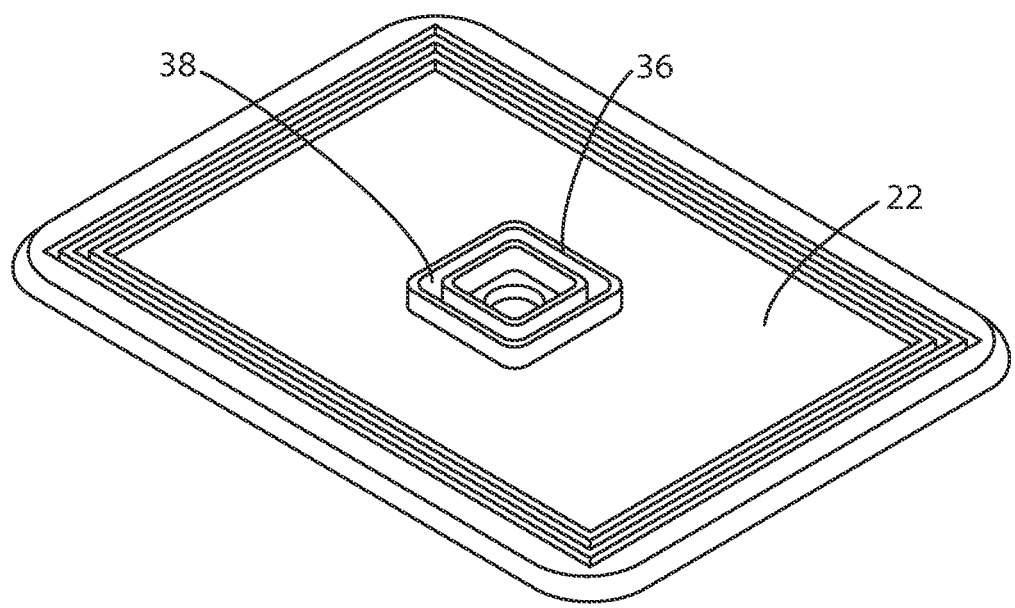
FIG. 8 is a perspective view of a separator plate of the apparatus of FIG. 1.

As best shown in FIG. 8, each separator plate 22 may include a raised central wall 36 surrounding the central bolt receiving aperture on the side of the spacer plate facing the adjacent pair of connector plates 24, said raised central wall 36 having a central recessed channel 38 formed therein and extending around the central bolt receiving aperture, the recessed channel 38 being dimensioned to receive a respective spacer 34 therein to locate each spacer 34 in position between respective opposing pairs of separator plates 22. Respective spacers 34 are located between each pair of separator plates 22, located within the recessed channels 38 formed in the raised central walls 36 thereof, such that the spacers 34 surround the bolt openings therein, such spacers 34 interlocking with the recessed channels 38 of the separator plates 33, such that the spacers 34 maintain a gap between the respective opposing pairs of connector plates 22. The spacers 34 may also serve to electrically insulate the connector plates 24 from the bolt 32.

Figure 9:
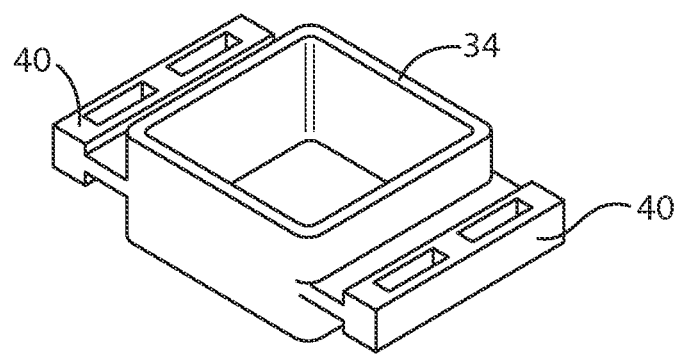
FIG. 9 is a detailed perspective view of a spacer of the apparatus of FIG. 1.

As best shown in FIG. 9, the spacers may also include laterally projecting portions 40 extending from opposite outer sides thereof to extend between a respective pair of connector plates 24, such that said portions 40 serve to maintain a gap between each pair of connector plates 24. Such portions 40 also may act as stops for preventing over-insertion of the busbars 6 into the busduct joint assembly. In the embodiment shown in the drawings, the spacers 34 are each defined by a square shaped peripheral wall having a central opening.

Each separator plate 22 may be formed with a raised wall portion 42 surrounding the central opening on the side of the spacer plate 22 opposite the associated connector plates 24. Such raised walls portions 42 serve to maintain a fixed minimum spacing between adjacent separator plates 22 on the opposite side of the separator plates 22 to the connector plates 24 to enable heat transfer ribs 52 of side cover plates 50 of the joint assembly 10 to be inserted between the separator plates 22, as will be described in more detail below.

Each of the busduct joint separator plates 22 may be provided with tapered edges to facilitate the insertion of busbar ends and the heat transfer ribs 52 of the side covers 50 into the busduct joint assembly 10.

The bolt 32 is configured to force the separator plates 22 into contact with the connector plates 24 and the connector plates 22 into contact with the busbars 6 of the busduct sections 2,4 so that electrical circuit integrity can be maintained. The bolt 32 also forces contact between the separator plates 22 and heat transfer ribs 52 of outer covers 50 of the busduct joint assembly 10, as will be described below in more detail.

Bellville spring washers 44 may be located between the head 46 of the bolt 32 and or its cooperating nut 48 and the respective joint cover plate 26,28. The head 46 of the bolt 32 may be received within a shaped recess in the respective joint cover plate 26,28 to prevent rotation of the bolt 32.

Busduct joint side covers 50 are provided to be located on either side of the busduct joint assembly 10. The joint side covers 50 may be fabricated from sections of extruded aluminium and may be cut from the sections on an as-needed basis. The busduct joint side covers 50 are designed to assist with the dissipation of heat from the busduct joint assembly 10. The outer faces of the side covers 50 are provided with integrally formed cooling fins 54. Inner faces of the side covers are provided with a plurality of laterally extending heat transfer ribs 52, adapted to be inserted between adjacent separator plates 22 on an opposite side of the separator plates 22 from the connector plates 24 to facilitate thermal conduction between the busbars 6, connector plates 24 and the joint side covers 50 via the electrically insulating separator plates 22. Thus the side covers 50 are thermally coupled to the busbars 6 and connector plates 24 of the joint assembly 10 while remaining electrically insulated from them, via the intervening electrically insulating separator plates 22.

Lateral side flanges 56 extend inwardly from the upper and lower edges of each side cover 50 to further increase the surface area of the side covers, further enhancing heat transfer from the joint assembly.

The side covers 50 may be secured to the joint assembly 10 via suitable fasteners inserted into the fixing blocks 18 of the duct housing of each busduct section 2,4 at either end of the joint assembly 10.

The upper and lower cover plates 26,28 and the side covers 50 effectively disipate heat from all sides of the joint assembly, greatly enhancing heat transfer from the joint assembly. The formation of the cover plates 26,28 and side covers 50 from aluminium extrusions, having cooling fins integrally formed on the outer surfaces thereof, maximises conduction and heat dissipation from the assembly. The heat transfer ribs 52 integrally formed on the inners faces of the side covers 50 extending between the separator plates 22 effectively extract heat from within the stack of separator plates 22, connector plates 24 and busbars 6 and conduct such heat to the cooling fins 54 of the side covers 50. By locating the heat transfer ribs 52 of the side covers 50 between adjacent pairs of separator plates 22, on an opposite side of the separator plates 22 from the connector plates 24 and busbars 6, any risk of short circuits or arcing between the busbars 6/connector plates 24 and the side covers 50 is avoided.

The invention is not limited to the embodiment(s) described herein but can be amended or modified without departing from the scope of the present invention. Those skilled in the art will recognize improvements and modifications to the preferred embodiments of the present disclosure. All such improvements and modifications are considered within the scope of the concepts disclosed herein and the claims that follow.

What is claimed is:

1. A joint assembly for a busduct comprising a stack of electrically insulating separator plates arranged in mutually adjacent pairs, each pair of separator plates having at least one electrically conductive connector plate located therebetween, each pair of separator plates defining a respective busbar receiving gap therebetween for receiving respective busbar ends of adjacent busduct sections to be in contact with the at least one connector plate therebetween such that said connector plate provides electrical continuity between respective busbars, upper and lower cover plates being located on either side of the stack of separator plates, the separator plates and connector plates having mutually aligned apertures formed therein, a fastener extending between said cover plates and through said mutually aligned apertures in order to clamp the separator plates and connector plates between the cover plates, a side cover being provided on at least one side of the stack of separator plates extending perpendicular to the separator plates, said side cover having at least one heat exchange rib that is integral with and extending from an inner face of the side cover to extend into the stack of separator plates, wherein said at least one heat exchange rib extends between adjacent pairs of separator plates, on an opposite side of the separator plates from the associated busbar receiving gap.

2. A joint assembly as claimed in claim 1, wherein a pair of side covers are provided, located on opposite sides of the stack of separator plates, each side cover having at least one heat exchange rib extending from an inner face of the side cover to extend into the stack of separator plates, wherein said at least one heat exchange rib extends between adjacent separator plates, on an opposite side of said separator plates from the associated busbar receiving gap.

3. A joint assembly as claimed in claim 1, wherein the or each side cover is provided with a plurality of substantially parallel heat exchange ribs arranged to extend between respective pairs of separator plates on a side of the separator plates opposite said connector plates.

4. A joint assembly as claimed in claim 1, wherein the or each side cover is provided with cooling fins on an outer surface thereof for increasing the surface area of the side cover to enhance heat transfer therefrom.

5. A joint assembly as claimed in claim 1, wherein the or each side cover is formed from an electrically conductive material.

6. A joint assembly as claimed in claim 5, wherein the or each side cover is formed from aluminum.

7. A joint assembly as claimed in claim 1, wherein the or each side cover includes lateral side flanges extending inwardly from upper and lower edges of the or each side cover to increase the surface area of the side covers, further enhancing heat transfer from the joint assembly.

8. A joint assembly as claimed in claim 1, wherein a pair of connector plates are located between each pair of separator plates such that an end of a busbar can be received between each pair of connector plates.

9. A joint assembly as claimed in claim 1, wherein said connector plates are formed from copper or aluminum.

10. A joint assembly as claimed claim 1, wherein spacers are located between each pair of separator plates to maintain a gap between each pair of spacer plates to enable the busbars of adjacent busduct sections to be inserted therebetween.

11. A joint assembly as claimed in claim 10, wherein the spacers are formed from an electrically insulating material.

12. A joint assembly as claimed in claim 10, wherein each spacer is provided with a central aperture through which said fastener extends.

13. A joint assembly as claimed in claim 12, wherein each separator plate includes a recessed channel formed therein dimensioned to receive a respective spacer therein to locate the spacers in position between respective opposing pairs of separator plates, wherein the spacers engage the recessed channels of the each respective pair of separator plates.

14. A joint assembly as claimed in claim 13, wherein said recessed channel is formed in a raised wall located around the fastener on a side of each separator plate adjacent to the associated at least one connector plate.

15. A joint assembly as claimed in claim 1, wherein the or each side cover is formed by an extrusion process.

16. A busduct assembly comprising first and second busduct sections, each busduct section comprising a plurality of busbars located within a busduct housing wherein said busbars extending beyond said housing at either end thereof, and a joint assembly comprising a stack of electrically insulating separator plates arranged in mutually adjacent pairs, each pair of separator plates having at least one electrically conductive connector plate located therebetween, each pair of separator plates defining a respective busbar receiving gap therebetween for receiving respective busbar ends of adjacent busduct sections to be in contact with the at least one connector plate therebetween such that said connector plate provides electrical continuity between respective busbars, upper and lower cover plates being located on either side of the stack of separator plates, the separator plates and connector plates having mutually aligned apertures formed therein, a fastener extending between said cover plates and through said mutually aligned apertures in order to clamp the separator plates and connector plates between the cover plates, a side cover being provided on at least one side of the stack of separator plates extending perpendicular to the separator plates, said side cover having at least one heat exchange rib that is integral with and extending from an inner face of the side cover to extend into the stack of separator plates, wherein said at least one heat exchange rib extends between adjacent pairs of separator plates, on an opposite side of the separator plates from the associated busbar receiving gap, wherein respective busbars of the first busduct are electrically coupled to corresponding busbars of the second busduct via the joint assembly.

* * * * *